3,165,443
NEBULISATE OF FUMARIA AND PROCESS OF PREPARATION

Victor Lafon, Paris, France, assignor, by mesne assignments, to Société Anonyme dite: Orsymonde, Paris, France
No Drawing. Filed Aug. 2, 1962, Ser. No. 214,193
6 Claims. (Cl. 167—55)

The present invention relates to a nebulisate of Fumaria and to a process of preparation of such a nebulisate.

It is known that the genus Fumaris includes about 75 species, sub-species and varieties; the applicant has used one of the following species:

Fumaria grandiflora;
Fumaria parviflora;
Fumaria officinalis;
Fumaria vaillantii.

The process of preparation of the nebulisate of Fumaria consists in carrying out the extraction of the plants defined above, preferably previously dried by means of an aqueous solvent at a temperature in the vicinity of the boiling point of the solvent, homogenising the decoction and, at a temperature below 70° C. and preferably below 50° C., effecting projection under pressure, in order to obtain the nebulisate by a known method.

According to a preferred feature of the process, plants in flower are used.

Two examples of the process of the invention are given below:

Flowering plants of *Fumaria officinalis* with their roots and after appropriate drying were used as a semi-fine powder (screen mesh 26), plants collected from May to July giving a yield of about 1 part of dried plants per 5 parts of fresh plants.

Example 1

1 kg. of the powder was introduced into 8 l. of cold water. The mixture was taken to boiling, which was maintained for 1 hour. The mixture was filtered. The decoction was introduced into a homogenising machine. It was projected in the form of a mist by passage through capillary apertures at a pressure of about 250 kg./cm.², into an enclosure traversed by a violent stream of air. The temperature was not allowed to exceed 70° C. and preferably 50° C. during this stage. A fine powder constituting the neublisate deposited on the bottom of the enclosure.

Example 2

1 kg. of powder was emptied into 10 l. of water at a temperature of about 40° C. Care was taken not to allow the temperature to exceed 50° C., which is the temperature of the mass of the concentrate itself during the nebulisation. Passage in the atmosphere was very brief and did not risk altering the active constituents. Using the procedure of this example, the yield varies between 15% and 17%.

A nebulisate prepared according to Example 2 has an improved biological activity.

The nebulisate of *Fumaria officinalis* has the form of a very fine powder of light brown colour, having an aromatic odour and a bitter taste.

This powder is very soluble in water, partially soluble in hot alcohol and benzene and virtually insoluble in ether, acetone and chloroform.

It has a humidity of 4–8% (oven at 80° C. for 48 hours). It can be characterised as follows:

(a) 1 g. of the nebulisate is dissolved in 20 ccs. of water. A limpid reddish-brown solution is obtained. The addition of 5 drops of picric acid solution immediately causes the formation of a brown precipitate.

(b) 2 g. of the nebulisate are dissolved in 25 ccs. of distilled water containing 5 ccs. of ammonia. It is placed in a decantation ampoule and shaken with 10 ccs. of chloroform. It is allowed to stand for 30 minutes and the chloroform layer is decanted; the product is filtered and evaporated in the free atmosphere.

The yellow-orange crystalline residue, in the presence of ferri-sulphuric acid (0.05% of ferric sulphate), assumes a clear red-violet colouration (Protopine reaction).

The nebulisate has a reducing action on Fehling's solution, after clarification with Courtonne's reagent, and before and after acid hydrolysis (boiling HCl for 30 minutes).

Mean values: Percent
  Before hydrolysis _____ 1 to 3
  After hydrolysis _____ 3 to 5

The average total nitrogen content, by Kjeldahl's method, is 2.51%.

The nebulisate is also characterised by means of a biological control as described below:

The method utilised consists essentially in producing a spasm in a free muscle, such as a rat duodenum. This spasm is obtained by means of a poison having an exclusively muscular action, such as barium chloride.

The spasm, which can be recorded in the intestine, studied by the Magnus technique, is persistent. It is alleviated however, when there is added to the Tyrode solution which maintains the duodenum either the nebulisate of the invention or an antispasmodic of mixed action, such as papaverine. This antispasmodic effect which is observed is not only qualitative, but is also quantitative. In fact, a relationship is observed between the antispasmodic effect and the dose of the nebulisate. On the other hand, it appears that the effect is reversible by washing. Under these circumstances, it is possible after having produced a spasm in the free muscle and after having alleviated the spasm by the nebulisate, to restore the muscle to its initial physiological conditions, by means of repeated washings and prolonged rest.

It is thus possible on the same isolated organ to study, after washing, the comparative action of various doses of the same sample and even of various samples.

The rats experimented upon weighed 175 to 250 grams, were of either sex and the females were not in a gravid state. It is important that the animals should be subjected to preliminary fasting for 20 hours.

The apparatus utilised is the known apparatus for the isolated intestine.

To maintain the sample alive, a standard Tyrode solution was used at a constant temperature of 32° C. Oxygenation was obtained by means of a small pump of the kind used for an aquarium.

The animal was killed by section of the carotid artery. It was then extended upon a table. The skin was first incised on the median line of the pubis by the xyphoid appendix and then through the abdominal wall. The intestinal mass was uncovered. The duodenum was carefully isolated and on its distal extremity a wire was passed. By means of a knot, two intermediate ligatures were produced which allowed two fragments of the duodenum to be separated. After section, one of the ends was fixed to a bent glass tube which served to oxygenise the preparation. The second wire was fixed to a frontal lever which was counterbalanced to amplify 4 to 6 times the peristaltic movements.

After 15 to 20 minutes of rest in the Tyrode solution, the duodenum was relaxed and ready for physiological testing. Oxygenation was reduced to a minimum and the peristaltic movements were recorded, which in the rat are extremely feeble.

However, if there is introduced into the bath, which contains, for example, 60 cc. of Tyrode solution, a dose of barium chloride of about 10 mg., a considerable contraction of the intestinal muscle and a state of persistent spasm are observed.

The preparation was then washed with the Tyrode liquid. The experiment was repeated every 10 minutes with the same dose of barium chloride until a constant response had been obtained. After each dose, the preparation was carefully washed with Tyrode liquid.

After a further washing followed by a rest of 10 minutes, the same dose of barium chloride was added to the Tyrode liquid in which the duodenum was immersed and, without proceeding with further washing, the macerated nebulisate was also added. The macerate was obtained by trituration in the cold with 10 parts of distilled water and one part of the nebulisate. The product obtained is soft but was utilised as such after agitation, without centrifugation or filtration. 0.5 cc. of the macerate or 0.05 g. per 60 ccs. were utilised and diminution in the intestinal contraction was noted.

After washing, there was studied under the same conditions the antispasmodic effect of papaverine hydrochloride (250 gamma/60 cc.). Finally, there was added for this purpose 2.5 cc. per 60 cc. of a $10^{-4}$ solution of papaverine hydrochloride, after a further washing and a rest of 20 minutes. On the same organ, the corresponding effect of 0.030 gram of the neublisate per 60 cc. of Tyrode solution, or 0.3 cc. of the macerate at 10% and then papaverine hydrochloride (200 gamma/60 cc.) of Tyrode or 2 cc. of the $10^{-4}$ solution of papaverine hydrochloride were studied.

When operating under conditions such that the inhibition of the spasm varies between 25% and 75%, the antispasmodic activity is proportional to the quantity of nebulisate. It is possible by graphic comparison to evaluate the activity of the nebulisate with respect to that of papaverine.

The present invention also relates to extracts of Fumaria and in particular to nebulisates of Fumaria obtained by the above-described process.

It is known that Fumaria contains alkaloids and this plant has therefore been used in therapeutics, but the neubulisate of the invention has different physiological properties from those of the alkaloids of the plant, which allow it to be used for novel purposes in therapeutics.

The results obtained in physiological tests were given below, for which aqueous macerates of 1/5 or 1/10 of the nebulisate were used.

The acute toxicity was determined in mice utilising the intraperitoneal route for administration.

32 female mice of the Webster strain were used, having weights ranging from 16 to 25 g. The animals were kept in individual cages throughout the period of observation; water and food were available ad libitum. The statistical study of the accuracy of the method was determined by the method of Lichtfield and Wilcoxon.

The average toxic dose was evaluated graphically by the method of Miller and Tainter; it is 1.12 g./kg.

The limits of toxicity in 19/20 cases were from 0.80 g./kg. to 2.66 g./kg.

The antispasmodic action was studied on isolated rat duodena maintained alive by the method of Magnus.

The rat duodenum was maintained alive by immersion in oxygenated Tyrode liquid at a temperature of $+32°$ C. As the spasmogenic agent, barium chloride and acetylcholine were used, so as to study both the musculotropic and neurotropic antispasmodic action.

The spasm produced by barium chloride (5 mg.) is diminished by 60% by the addition to the Tyrode bath (60 ccs.) of 30 mg. of the nebulisate. These results are the mean of 26 tests.

On the rat duodenum, the spasm produced by $10\gamma$ of acetylcholine in 60 ccs. of Tyrode is diminished by 80% by the addition of 10 mg. of the nebulisate.

An identical effect is obtained with papaverine.

Whether the nebulisate also exerts an antispasmodic effect in situ has also been verified. In order to judge the pharmacodynamic spectrum, the cardio-vascular effect, the respiratory action and the effect on choleresis have also been studied.

The antispasmodic action in situ was studied in the dog anaesthetised with chloralose and subjected to artificial respiration. The peristaltic movements were recorded by the standard method using a balloon inserted into the duodenum and connected to a Marey capsule. Both the musculotropic antispasmodic action and the neurotropic antispasmodic action have been studied.

In the chloralosed dog subjected to artificial respiration, intestinal spasm was produced by the injection of 3 mg./kg. of barium chloride, administered intravenously. On 3 dogs experimented upon in this way, the injection of 50 mg. and 75 mg./kg. was completely ineffective to alleviate the barytic spasm.

In other experiments, intestinal contraction, bronchoconstriction and exaggeration of peristalsis were produced by intravenous injection of $5\gamma$/kg. of carbaminolcholyl (mecholyl). The nebulisate in a dose of 50 mg./kg. only very slightly diminished the effect of the mecholyl on the pressure and had no effect on the peristalsis or on the bronches.

The cardiovascular effect was studied by the standard method using dogs anaesthetised with chloralose. Doses of 50 to 70 mg./kg. produced a drop in carotid pressure which lasted for about 30 minutes. This effect gives rise to tachyphylaxia on repeated injections. It is thus observed that the nebulisate exerts either a hypotensive effect of low intensity or a hypertensive effect.

To verify whether the hypotensive effect observed was or was not due to a cardiac depressant action, the hypotensive action was compared with the cardiac action studied by the suspension method.

On the rabbit heart in situ studied by the suspension method, the hypotensive effect observed after intravenous injection of the nebulisate is not accompanied by a cardiac depressant action when using doses of 50 to 100 mg./kg.

To verify whether the hypotensive action was or was not due to an adrenolytic action, the modifying effect on the hypertensive action of adrenaline was studied in the chloralosed dog. Experiments effected on a chloralosed dog showed that the hypertensive effect of $3\gamma$ of adrenaline is markedly diminished after injection of 50 mg./kg. of the nebulisate administered intravenously.

No inversion of the tensional effect was observed. The modifying action vis-a-vis acetylcholine has also been studied. The hypotensive effect of $2\gamma$ of acetylcholine does not appear to be appreciably diminished.

In spite of the absence of marked anti-spasmodic action in vivo, the modifying effect of the product on biliary output has been studied; it appears likely in fact that the antispasmodic effect is not connected ipso facto with the anticholeretic effect.

Study of the choleresis was effected in the dog, which gives much more constant and reliable results than the rat.

Chronic choleresis was used in the dog, utilising a modification of the Rutherford technique, which consists essentially in catheterising the choledoch duct. After ligature of the cystic duct, the biliary vesicle is eliminated and only the product of hepatic secretion is recovered.

After having first effected catheterisation under the most strict aseptic conditions and after administration of antibiotics, the animal is left to recover.

The animal is fed twice a day by adding to its food chopped meat and beef bile.

After twelve days, when the biliary secretion appears normal, the modifying effect of the product on the choleresis is determined. The non-anaesthetised animal is suspended from a support. The bile is collected every 15 minutes until the yield is constant, which is generally observed after one hour.

The product is then injected intravenously, the bile is collected every 15 minutes and the biliary volume, the dry extract and the main biliary constituents (cholesterol, cholic acid and bilirubin) are determined.

The tests were effected on 5 dogs by administering the nebulisate in doses of 50 to 75 mg./kg.

On 3 dogs, a dose of 50 mg/kg. produced a diminution of the choleresis which lasted for one hour. A dose of 75 mg./kg., on 2 dogs, also caused diminution of choleresis of short duration, which was followed by an increase in choleresis.

It seemed of interest to compare the choleresis in the dog with the cardiovascular, respiratory and intestinal action. This experiment was carried out on the anaesthetised dog, the cardiovascular, respiratory and intestinal action of which had been recorded by the standard method. The choleresis was determined by graphic recordal of the drops, effected by means of an electric dropcounter.

In a chloralosed dog, examined 4½ hours after the beginning of anaesthesia, at the moment when the effect of the chloralose was finished and the biliary yield had become regular, intravenous injection of 50 mg./kg. of the nebulisate produced a very marked diminution of choleresis (76.7%) which lasted for 15 minutes and which fell to 19% after 15 minutes. Return to normal was observed after 30 minutes.

Study of the antiserotonine action of the nebulisate was then effected.

Firstly, the effect on isolated organs was studied, on guinea-pig ileum, the nebulisate, in a dose of 1.6 to 2 gamma/cc., exerting an antiserotonine effect diminishing by 50% the contraction caused by the serotonine.

The effect of the nebulisate on the rat uterus on oestrus is extremely moderate and no effect was observed up to 500 gamma/60 cc.

The effect was then studied in situ on the carotid pressure of the dog, a dose of 5 mg./kg. of nebulisate not being antiserotonic. On the other hand a dose of 25 mg./kg. exerted a moderate antiserotonine action on the carotid pressure, but was extremely intense as regards the peristaltogenic effect. At this dose, and at doses of 15 mg. to 20 mg., the effect of the serotonine had been diminished considerably for one hour and 15 minutes and it is interesting to note that 1-benzyl-2,5-dimethyl-serotonine (BAS) in a dose of 5 mg./kg. does not possess this antiperistaltogenic action as regards serotonine.

In doses varying between 12.5 mg. and 150 mg./kg., the nebulisate diminished in a statistically significant manner oedema of the paw of the rat caused by local injection of formaldehyde.

At doses of 10 to 200 mg./kg., the nebulisate protected a certain number of rats against gastric ulcer caused by subcutaneous injection of 15 mg./kg. of serotonine.

Clinical tests have confirmed the results of the pharmacodynamic tests and it was observed that cachets, pills, lozenges and tablets containing 0.20 to 0.40 g. of the nebulisate of Fumaria, 2 to 6 being taken per day, remedied very effectively migraines of digestive origin and hypochondriac melancholia of hepatic origin.

The nebulisate of Fumaria is effective against hepatic colitis and proves to be very useful to suppress and even prevent the melancholia and nausea in treatments with sodium morphine dehydrocholate.

The tests were effected on about 40 patients at the central hospital region of Rouen (Seine Maritime, France) and are summarised below:

The nebulisate, generally used in doses of 4 to 6 cachets of tablets per day, was well tolerated by the patients.

It was observed as follows:

18 favourable results in the course of treatment of melancholia caused by morphine choleresis;

1 failure during the test;

4 favourable results on melancholia caused by radiography with absorption of "Bladex";

24 favourable results in a treatment of long duration in patients suffering from migraines of hepatic origin or biliary duct disorders;

2 imperfect results after treatment of long duration;

2 failures.

In summary, the nebulisate according to the invention very often proves to be a remarkable product and, in certain cases, has permitted transformation of the life of certain patients suffering for a long time.

Various pharmaceutical forms have been produced according to the following examples.

|  | G. |
|---|---|
| (a) Nebulisate of Fumaria | 0.40 |
| Lactose | 0.10 |
| (for 1 cachet) | |
| (b) Nebulisate of Fumaria | 0.40 |
| (for 1 capsule) | |
| (c) Nebulisate of Fumaria | 0.40 |
| (Excipient, q.s. for 1 coated tablet) | |
| (d) For a coated tablet weighing 0.60 g.: | |
| Nebulisate of Fumaria | 0.25 |
| Levilite | 0.060 |
| Sugar | 0.030 |
| Then on compression there is added: | |
| Starch | 0.020 |
| Levilite | 0.004 |
| Magnesium stearate | 0.004 |
| Talc | 0.002 |
| And for the coating step: | |
| Sugar | 0.155 |
| Talc | 0.072 | and traces of gelatin, titanium oxide, tartrazine yellow and wax.

In conclusion, it can be stated that the nebulisate of Fumaria has a very low toxicity. In vitro, it exerts a slight antispasmodic action on isolated organs, but has no effect on organs in situ. It diminishes biliary output. Also, it belongs to the class of hypocholeretics which can be considered nowadays, in certain biliary duct disorders, to be preferable to choleretics, possibly because of their antispasmodic properties.

I claim:

1. A process for the preparation of a nebulisate of a member of the genus Fumaris selected from the group consisting of *Fumaria grandiflora, Fumaria parviflora, Fumaria officinalis* and *Fumaria vaillantii* which consists essentially of admixing a semi-fine powder obtained from one of the said Fumaria species with cold water in the amount of approximately 1 kilogram of such powder per 8 to 10 liters of water, boiling the resulting mixture for about one hour, filtering the boiled mixture, homogenizing the resulting filtered decoction and projecting the homogenizate in mist form at a temperature in the range of about 40° C. to 70° C. by passing it through capillary apertures at a pressure of about 250 kilograms per square centimeter into an enclosure through which a violent stream of air is passed.

2. A process according to claim 1, in which the species of genus Fumaris is *Fumaria officinalis*.

3. A process according to claim 1, in which plants in flower are used as the starting material.

4. A pharmaceutical composition in unit oral dosage form consisting essentially of 0.25 to 0.40 gram of a nebulisate of a member of the genus Fumaris selected from the group consisting of *Fumaria grandiflora, Fumaria parviflora, Fumaria officinalis* and *Fumaria vaillantii* combined with a physiologically acceptable pharmaceutical carrier.

5. A pharmaceutical composition in unit oral dosage form consisting essentially of 0.25 to 0.40 gram of a nebulisate of *Fumaria officinalis* combined with a physiologically acceptable pharmaceutical carrier.

6. A method of treating hepatic colic which comprises administering daily to a patient in need thereof 4 to 6 oral dosage units of the composition of claim 5.

References Cited in the file of this patent

UNITED STATES PATENTS

| | | |
|---|---|---|
| 2,788,276 | Reich et al. | Apr. 9, 1957 |
| 2,833,653 | Chase et al. | May 6, 1958 |
| 2,863,775 | Perech | Dec. 9, 1958 |
| 2,872,323 | Perech | Feb. 3, 1959 |
| 2,912,334 | Wetherilt | Nov. 10, 1959 |
| 3,030,271 | Lafon | Apr. 17, 1962 |

OTHER REFERENCES

Steinmetz: "Codex Vegetabilis," page 483T/M491, entry No. 491, *"Fumaria Officinalis,"* published 1957, by E. F. Steinmetz, Keizersgracht 347, Amsterdam, Netherlands.